United States Patent
Karlsen et al.

(10) Patent No.: US 9,648,659 B2
(45) Date of Patent: May 9, 2017

(54) RADIO EFFICIENT TCP RELEASE

(71) Applicants: Johnny Karlsen, Järfälla (SE); Per Willars, Vaxholm (SE)

(72) Inventors: Johnny Karlsen, Järfälla (SE); Per Willars, Vaxholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 210 days.

(21) Appl. No.: 14/349,398

(22) PCT Filed: Oct. 5, 2012

(86) PCT No.: PCT/SE2012/051065
§ 371 (c)(1),
(2) Date: Apr. 3, 2014

(87) PCT Pub. No.: WO2013/052002
PCT Pub. Date: Apr. 11, 2013

(65) Prior Publication Data
US 2014/0241251 A1    Aug. 28, 2014

Related U.S. Application Data

(60) Provisional application No. 61/543,500, filed on Oct. 5, 2011.

(51) Int. Cl.
*H04W 76/06* (2009.01)
*H04W 80/06* (2009.01)

(52) U.S. Cl.
CPC ....... *H04W 76/066* (2013.01); *H04W 76/064* (2013.01); *H04W 76/068* (2013.01); *H04W 80/06* (2013.01)

(58) Field of Classification Search
CPC ....... H04L 12/58; H04L 12/589; H04L 67/22; H04L 65/1016; H04W 24/10
See application file for complete search history.

(56) References Cited

U.S. PATENT DOCUMENTS

2004/0017795 A1  1/2004  Abraham et al.
2005/0063304 A1  3/2005  Sillasto et al.
(Continued)

FOREIGN PATENT DOCUMENTS

EP   0 903 905 A2   3/1999
EP   0 903 906 A1   3/1999
(Continued)

OTHER PUBLICATIONS

International Search Report, Application No. PCT/SE2012/051065, May 6, 2013.
(Continued)

*Primary Examiner* — Alvin Zhu
(74) *Attorney, Agent, or Firm* — Sage Patent Group

(57) ABSTRACT

A radio communication handling device handling communication for an application running in a mobile station and communicating with an application server via a mobile communication network includes a radio resource determination unit that determines a state transition for the radio resources between the mobile station and the mobile communication network from a first current state to a second state, where the first state involves communication with a higher bandwidth than the second state, and informs, prior to the transition, at least one application communication control unit about the transition in order to allow the application communication control unit to release unused application communication connections before the transition. The application communication control unit receives the information about the following state transition and determines whether to release an application communication connection or not based on the information.

35 Claims, 5 Drawing Sheets

(56) References Cited

U.S. PATENT DOCUMENTS

| | | | | |
|---|---|---|---|---|
| 2008/0304440 A1* | 12/2008 | Jun | ................... | H04W 76/025 |
| | | | | 370/328 |
| 2009/0124249 A1* | 5/2009 | Young | .................. | H04W 72/02 |
| | | | | 455/422.1 |
| 2013/0205302 A1* | 8/2013 | Nakagawa | ............ | G06F 9/5022 |
| | | | | 718/104 |

FOREIGN PATENT DOCUMENTS

| | | |
|---|---|---|
| GB | 2 351 874 A | 1/2001 |
| WO | WO 2008/115108 A1 | 9/2008 |

OTHER PUBLICATIONS

Written Opinion of the International Searching Authority, Application No. PCT/SE2012/051065, May 6, 2013.
Communication with Supplementary European Search Report, Application No. EP 12838965.7, Oct. 16, 2015.

* cited by examiner

RADIO EFFICIENT TCP RELEASE

CROSS REFERENCE TO RELATED APPLICATIONS

This application is a 35 U.S.C. §371 national stage application of PCT International Application No. PCT/SE2012/051065, filed on 5 Oct. 2012, which itself claims priority to U.S. Provisional Patent Application No. 61/543,500, filed 5 Oct. 2011, the disclosure and content of both of which are incorporated by reference herein in their entirety. The above-referenced PCT International Application was published in the English language as International Publication No. WO 2013/052002 A3 on 11 Apr. 2013.

TECHNICAL FIELD

The invention concerns mobile communication. More particularly, the invention concerns a method and computer program product for enabling avoiding of unnecessary radio resource use by a mobile station, a radio communication handling device handling communication for an application running in a mobile station as well as to a method, a connection releasing device and computer program product for controlling the release of application communication connections for an application in a mobile station.

BACKGROUND

Application/Service data as downloaded in a browser or application session is transported by means of an Internet Protocol (IP) packet stream. This IP packet stream can be based on either Transmission Control Protocol (TCP) or User Datagram Protocol (UDP). TCP is a connection oriented protocol which has a setup and teardown procedure. Once a TCP connection is established an application protocol, such as Hypertext Transfer Protocol (HTTP) may be used on top to transfer the data and when the application is finished with the data transfer the TCP connection can be released. A TCP connection is thus one type of application communication connection and UDP another type of application communication connection.

TCP connections can either be persistent, an application keeping a constant connection to a server to fetch or send new data whenever need arises, or the TCP connection can be non-persistent in which case the TCP connection is released whenever there is no data immediate to transfer, once the need arises again a new TCP connection is setup.

Processing and latency may be saved if the connection is persistent; depending on application behavior e.g. intermittent data exchanged between one and the same server during a long time. The value of persistency is less if data is continuously exchanged with different servers.

It is well known that connection persistency is very valuable when a high number of data items should be collected from the same server; the persistency will here remove the phenomena of TCP slow start for all the subsequent items, this given that the data items are fetched from the server back to back with no or very small interruptions in between.

Usually there is little cost for a client to maintain a persistent connection, a certain amount of memory for state and buffers but no processing is associated with the persistency. On the server side of the connection the persistency can be more of an issue since many clients are connected to the same server and the memory associated with the persistent connections need to be balanced with the processing cost of setting up and tearing down TCP connections with same client over and over again. Different server setups will have different strategies.

Usually the decision to maintain or tear down a connection can be taken very dynamically, irrespectively of when a decision is taken the cost associated with the release (exchange of data on an IP network to negotiate the release) is the same; there is no time dependency in the cost.

In particular each end of the connection can maintain its own strategies and release the connection whenever its own set of criteria is fulfilled.

The common strategy by both the client and the server is to release the TCP a fixed set of seconds (timer) after the last transmission on the connection. If something is sent before the expiry of the timer, the timer is restarted and the same fixed time is re-applied. A server may also choose to maintain connections for as long as it has the resources and then release connections when resources are exhausted.

In a radio access network where there is a time dependency in transport/power consumption/load cost it is not obvious that the handling of the IP connection can be totally independent of the state of the underlying radio access network. Depending on state in the radio access network the transmission of user data will have different cost.

It is also usually so that the state of the radio access network is not known to both ends of the connection. In particular the server side of the connection is usually unaware of the current state of the radio network.

In a Wideband Code Division Multiple Access (WCDMA) system the exact state behaviour of the radio access network will depend on a number of entities, timers and strategies used by the cellular network operator and also timers and strategies used by the device vendor. In particular there are a number of timers in the cellular network: T1 inactivity to transition from Dedicated Channel (DCH) to Forward Access Channel (FACH) and T2 inactivity to transition from FACH to URA (UTRAN Registration Area) Paging Channel/Cell Paging Channel/Idle (URA_PCH/CELL_PCH/Idle). There is also a device initiated state transition from DCH/FACH to URA_PCH/CELL_PCH/Idle called Fast Dormancy. Today these transitions are executed without coordination with TCP releases.

Usually it is the behaviour of the user data flow that will control in which state the radio access network will be in, but the exact transition times and strategies used will vary among the networks and can also have a time variance due to different traffic load etc.

In a situation as above it is for example costly to have the server side terminate an IP connection since the release of the connection can happen in a radio network state where the device need to be paged, the device has no assigned physical channel and the system need to broadcast a request to re-establish the physical channel.

There is therefore a need for an improvement in the way application communication connections are released.

SUMMARY

The present invention is concerned with providing an improved method for enabling avoiding of unnecessary radio resource use by a mobile station having an application communicating with an application server via a mobile communication network.

This object is according to a first aspect obtained through a method for enabling avoiding of unnecessary radio resource use by a mobile station having an application communicating with an application server via a mobile communication network using an application communication protocol. The method is performed for radio communication involving the mobile station and comprises:

determining, in a radio resource determination unit, a state transition for the radio resources between the mobile station and the mobile communication network from a first current state to a second state, where the first state involves communication with a higher bandwidth than the second state, and informing, by the radio resource determination unit and prior to the transition, at least one application communication control unit about the transition in order to allow the application communication control unit to release unused application communication connections before the transition.

Another object is to provide a radio communication handling device that enables avoiding of unnecessary radio resource use by a mobile station.

This object is according to a second aspect achieved through a radio communication handling device handling communication for an application running in a mobile station and communicating with an application server via a mobile communication network. The radio communication handling device comprises:

a radio resource determination unit configured to determine a state transition for the radio resources between the mobile station and the mobile communication network from a first current state to a second state, where the first state involves communication with a higher bandwidth than the second state, and inform, prior to the transition, at least one application communication control unit about the transition in order to allow the application communication control unit to release unused application communication connections before the transition.

Yet another object is to provide, a computer program product that enables avoiding of unnecessary radio resource use by a mobile station having an application communicating with an application server.

This object is according to a third aspect obtained through a computer program product for enabling avoiding of unnecessary radio resource use by a mobile station having an application communicating with an application server via a mobile communication network using an application communication protocol, the computer program product comprising a computer readable storage medium comprising computer program code causing a radio resource determination unit of a radio communication handing device to:

determine a state transition for the radio resources between the mobile station and the mobile communication network from a first current state to a second state, where the first state involves communication with a higher bandwidth than the second state, and inform, prior to the transition, at least one application communication control unit about the transition in order to allow the application communication control unit to release unused application communication connections before the transition.

According to a first variation of the first aspect, the method further comprises disregarding, by the radio resource determination unit, connectivity control commands from an application handling unit in relation to a state transition.

According to a first variation of the second aspect, the radio resource determination unit is further configured to disregard connectivity control commands from an application handling unit in relation to a state transition.

The state change determination may be based on estimating the time of expiry of at least one state change timer of the mobile communication network.

The radio resource determination unit may because of this comprise a network state change estimating element configured to estimate the time of expiry of at least one state change timer of the mobile communication network.

According to another variation of the first aspect, the method further comprises sending, by the radio resource determination unit to the application communication control unit, an indication of the current state and considering, in the application communication control unit, the current state when releasing application communication connections.

According to a corresponding variation of the second aspect, the application communication control unit is further configured to receive an indication of the current state from the radio resource determination unit and consider the current state when releasing application communication connections.

According to another variation of the second aspect, the radio communication handling device further comprises at least one of the application communication control units, which is configured to determine whether to release an application communication connection or not based on the informing.

According to a further variation, the considering of the current state comprises sequentially initiating the release of multiple application communication connections.

The application communication control unit may therefore be configured to determine whether to release an application communication connection or not based on knowledge of the connection release behaviour of the corresponding application server.

According to a further variation of the first aspect, the method further comprises, determining, by the application communication control unit, whether to release an application communication connection or not based on knowledge of the connection release behaviour of a corresponding application server.

According to another variation the radio communication handling device is the mobile station and therefore the radio resource determination unit is provided in the mobile station, the application communication control unit is a connection handling unit in the mobile station and the state transition is determined based on a low activity indicator of the mobile station. The radio resource determination unit may comprise a local state change element configured to determine the state transition based on this low activity indicator.

According to another variation of the first aspect, the low activity indicator is obtained based on investigating the amount of data of a transmission buffer of the mobile station or the amount of data sent or received during a time period.

According to a corresponding variation of the radio communication handling device, the local state change element is configured to determine the low activity indicator based on investigating the amount of data of a transmission buffer of the mobile station or the amount of data sent or received during a time period.

This low activity indicator may be obtained based on a low activity level of a user interface. Therefore the local state change element is configured to determine the low activity indicator based on this low activity level of the user interface.

The resource determination unit may be provided in a node of the mobile communication network and one application communication control unit may be a proxy unit in the mobile communication network handling communication of an application with a corresponding application server. In this case the informing may be an informing of the proxy unit of the determined state transition, in order to let the proxy unit release at least one application communication connection.

In another variation of the first aspect, the method comprises releasing, by the proxy unit, at least one application communication connection before the transition to the second state, thereby making the application also release at least one application communication connection.

In a corresponding variation of the fourth aspect the radio communication handling device comprises said proxy unit, the proxy unit is further configured to release at least one application communication connection before the transition to the second state, thereby making the application also release at least one application communication connection.

Another object of the invention is to provide a method for controlling the release of application communication connections for an application in a mobile station, where unnecessary radio resource use by a mobile station is avoided.

This object is according to a fourth aspect of the invention, achieved by a method for controlling the release of application communication connections for an application in a mobile station, where the application communicating with a corresponding application server via a mobile communication network using an application communication protocol. The method is performed in an application communication control unit and comprises: receiving, from a radio resource determination unit for radio communication involving the mobile station, information about a following state transition for the radio communication between the mobile station and the mobile communication network from a first current state to a second state, where the first state involves communication with a higher bandwidth than the second state, and
determining whether to release an application communication connection or not based on the information.

Another object is to provide a connection releasing device for controlling the release of application communication connections for an application in a mobile station, where unnecessary radio resource use by a mobile station is avoided.

This object is according to a sixth aspect achieved through a connection releasing device for controlling the release of application communication connections for an application in a mobile station. The application communicates with a corresponding application server via a mobile communication network using an application communication protocol. The connection releasing device comprises an application communication control unit configured to:
receive, from a radio resource determination unit for radio communication involving the mobile station, information about a following state transition for the radio communication between the mobile station and the mobile communication network from a first current state to a second state, where the first state involves communication with a higher bandwidth than the second state and
determine whether to release an application communication connection or not based on the information.

Another object is to provide a computer program product for controlling the release of application communication connections for an application in a mobile station where unnecessary radio resource use by a mobile station is avoided.

This object is according to a sixth aspect achieved through a computer program product for controlling the release of application communication connections for an application in a mobile station. The application communicates with a corresponding application server via a mobile communication network using an application communication protocol. The computer program product comprises a computer readable storage medium comprising computer program code causing an application communication control unit of a connection releasing device to:
receive, from a radio resource determination unit for radio communication involving the mobile station, information about a following state transition for the radio communication between the mobile station and the mobile communication network from a first current state to a second state, where the first state involves communication with a higher bandwidth than the second state and
determine whether to release an application communication connection or not based on the information.

According to a first variation of the fourth aspect, the method further comprises receiving an indication of the current state and considering the state when releasing application communication connections.

According to a first variation of the fifth aspect, the application communication control unit is further configured to receive an indication of the current state and consider the state when releasing application communication connections.

According to a second variation of the fourth and fifth aspects, the considering of the state comprises sequentially initiating the release of multiple application communication connections.

According to a third variation of the fourth aspect, the determining of whether to release an application communication connection or not is based on knowledge of the connection release behaviour of the corresponding application server.

According to a third variation of the fifth aspect, the application communication control unit is further configured to determine whether to release an application communication connection or not based on knowledge of the connection release behaviour of the corresponding application server.

The connection releasing device may be a network node. The application communication control unit may be a proxy unit in the mobile communication network handling communication of the application with the application server.

According to a fourth variation of the fourth aspect, the method may then further comprise releasing, by the proxy unit, at least one application communication connection before the transition to the second state thereby making the application in the mobile station also release at least one application communication connection.

According to a fourth variation of the fifth aspect, the proxy unit is further configured to release at least one application communication connection before the transition to the second state thereby making the application in the mobile station also release at least one application communication connection.

The application communication connection releasing device may also be a mobile station and the application communication control unit may be a connection handling unit in the mobile station.

The invention has a number of advantages. The invention employs dynamic release of unused application communication connections. Because of this battery drain and radio network load can be minimized and at the same time keep some of the advantages of having long application communication connection release timeout.

One aspect of the invention is directed towards coupling the handling of application communication connection releases to the state of the radio access network. Thereby the following objectives are achieved:
minimize power consumption in the device
minimize load on the radio access network
And at the same time minimize any impact on user experience.

BRIEF DESCRIPTION OF THE DRAWINGS

The invention will now be described in more detail in relation to the enclosed drawings, in which.

DETAILED DESCRIPTION

The invention will in the following be described in relation to a Wideband Code Division Multiple Access (WCDMA) mobile communication system. It should however be realized that the invention could be used in relation to other systems such as Long Term Evolution (LTE). Consequently the entity Radio Network Controller (RNC) described below could be a base station (eNodeB) instead.

Figure 1:
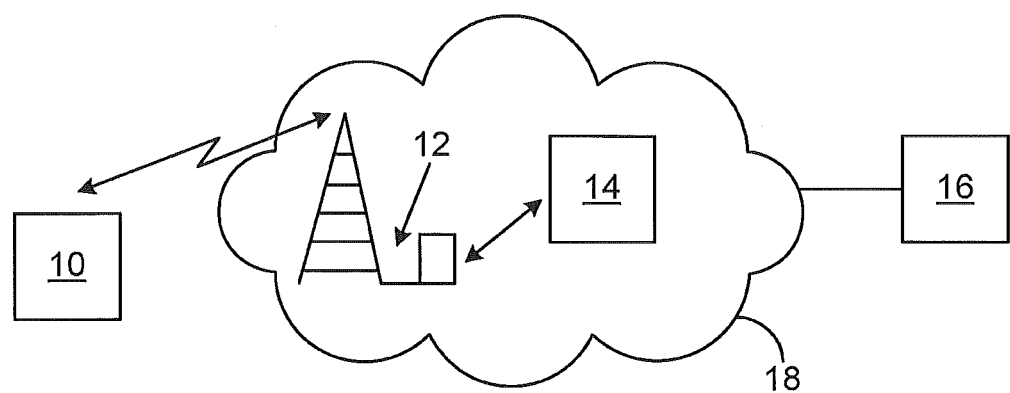
FIG. 1 schematically shows a mobile station and an application server communicating with a mobile communication system, FIG. 2 schematically shows a first realization of the mobile station, FIG. 3 schematically shows a second realization of the mobile station, FIG. 4 schematically shows the transitions between a number of radio states, FIG. 5 schematically shows one realization of a radio resource determining unit.

FIG. 1 schematically shows a mobile station 10 communicating with a base station 12 of a mobile communication system. The base station 12 in turn communicates with an RNC 14. There is also an application server 16 connected to the system 18. The mobile station 10 and application server 16 are in this variation of the invention not parts of the system 18.

Figure 2:
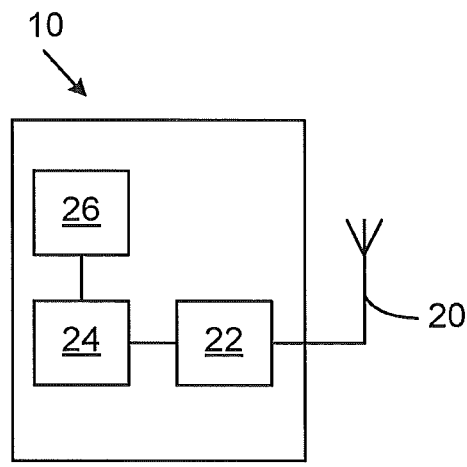

FIG. 2 schematically shows a first realization of the mobile station 10. The mobile station 10 according to this first realization comprises an antenna 20 and a radio communication unit 22 providing radio communication according to the radio communication technology of the system or network 18, here Wideband Code Multiple Access (WCDMA). The mobile station 10 also comprises a radio resource determination unit 24, which is connected to an application 26. The application 26 comprises a communication control unit, which in the realization is a communication handling unit for the application, such as a TCP engine, in the following termed TCP part. In this first realization the TCP engine is a part of the application.

Figure 3:
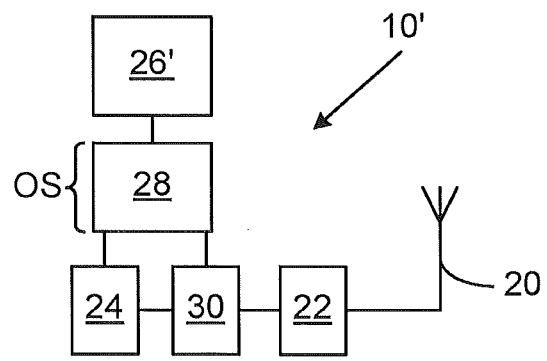

FIG. 3 shows a second realization of the mobile station 10'. In this second realization the application 26' is connected to an application communication control unit, also in the form of a communication handling unit for the application. This communication handling unit is also here a Transmission Control Protocol (TCP) engine or TCP part that is a part 28 of an operating system OS of the mobile terminal. In this second realization there is also a communication handling unit, which is a part 28 of the operating system OS of the mobile station. There is also a buffer, a transmission buffer 30, and the radio resource determining unit 24. Both the radio resource determining unit 24 and transmission buffer 30 are connected to the communication handling unit 28. The radio resource determining unit 24 is also connected to the transmission buffer 30, which is further connected to the radio communication unit 22 leading to the antenna 20.

Figure 4:
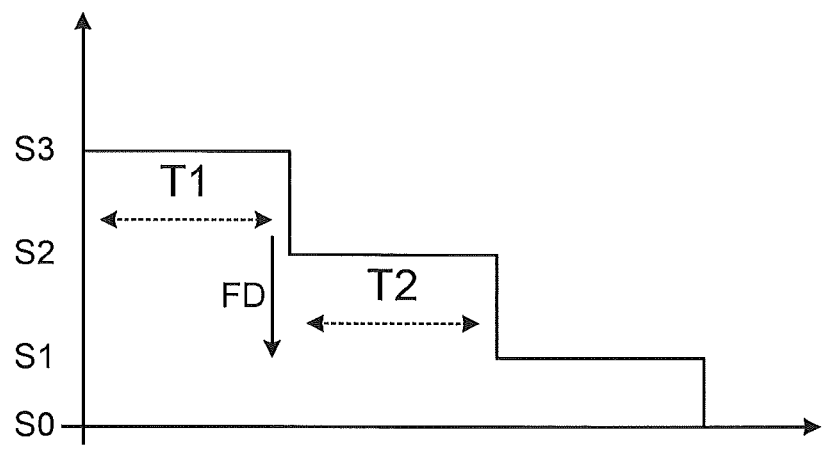

FIG. 4 schematically shows a number of radio states S0, S1, S2 and S3, where state S0 is an idle state, state S1 is a URA (UTRAN Registration Area) Paging Channel/Cell Paging Channel (URA_PCH/CELL_PCH) state, state S2 is a Cell Forward Access Channel (CELL_FACH) state and state S3 is a Dedicated Channel High Speed (DCH/HS) state. The time t at the state axis is here as time at which a current transaction ends. The figure more particularly shows the change from state S3 to state S2, from state S2 to state S1 and from state S1 to state S0 together with network timers T1 and T2 and an arrow indicating a fast dormancy mode FD of the mobile station 10. State transition after the end of an application transaction here depends on the timers T1 and T2, the fast dormancy strategy of the mobile station and the activity of other applications. As can be seen there is a state transition at a time corresponding to the time of the first timer T1 from state S3 to state S2 after the end of the current transaction. There, is furthermore a change from state S2 to S1 that may be based on a fast dormancy strategy FD or based on a second timer T2.

Figure 5:
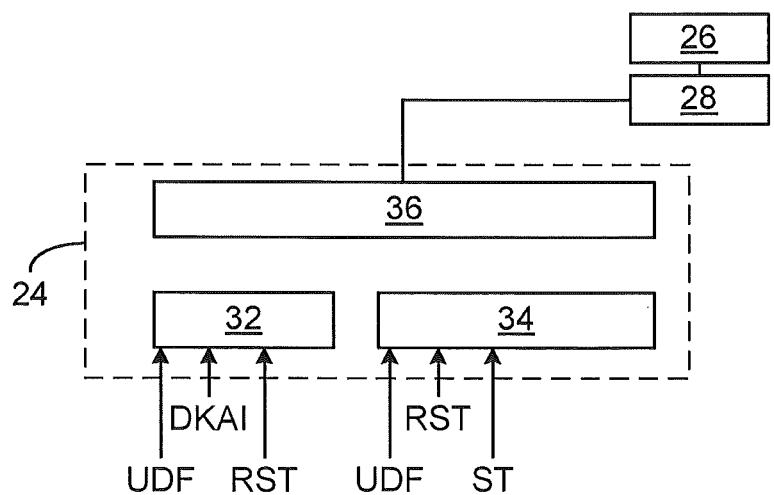

FIG. 5 shows one realization of the radio resource determining unit 24. It comprises a local state change element 32 that obtains a low activity indicator in the form of information about user data flow UDF, display keypad activity information DKAI and radio state technology RST. It also comprises a network state change estimating element 34 configured to obtain information of user data flows UDF, radio state technology RST and state transitions ST. These two elements 32 and 34 are furthermore connected to a combining element 36, which in turn is connected to the TCP part 28 connected to the application 26.

The mobile station 10 or user equipment is provided with the application 26 and communicates with the application server 16 via the mobile communication network 18 using an application communication protocol, which is here. TCP. Furthermore in this communication, the application uses application communication connections that are being set up between the application server and the application in the mobile station. The application in the mobile station is normally also termed a client.

These application communication connections are connections set up according to the communication protocol and in this example thus TCP connections, which connections are transported using the radio resources between the mobile station and the network.

For this reason, the network 18 comprises the base station 12 communicating with the mobile station and the RNC 14 handling the communication between the base station 12 and the mobile station 10. These network units are provided in a radio access network. There is also a core network, which has been omitted for simplifying the description of the invention.

In a first variation of the invention the mobile station 10 is a radio. communication handling device that handles communication for the application 26 running in the mobile station. In order to handle the radio communication the device comprises the antenna 20. and the radio communication unit 22 providing radio communication according to the radio communication technology of the system or network 18, here WCDMA. The mobile station 10 also comprises the radio resource determination unit 24. It may here also be mentioned that in a second variation of the invention a network node, like an RNC, forms a radio communication handling device.

In the communication the radio resources may be provided according to communication states as seen in FIG. 4, where a higher vertical level indicates a higher bandwidth and a lower vertical level a lower bandwidth. Bandwidth is here assigned by the radio communication unit 22 based on need. The radio resources may here be resources in layer L1 and L2 of the OSI model, i.e. in the data link and physical layers. Such states and more particularly a transition from a higher state to a lower may be set by the radio communication unit 22 of the mobile station (fast dormancy) or by the network, typically RNC 14, (state change timers T1, T2).

This means that a fast dormancy decision taken by the radio communication unit 22 or a corresponding decision of the RNC 14 caused by the expiry of a timer T1 or T2 causes a state transition from a first current level or state to a second following level or state, where the first state involves communication with a higher bandwidth than the second state. A state change may in the example of FIG. 4 be from the state S3 of the level DCH/HS to state S2, CELL_FACH, state S1, URA_PCH/CELL_PCH, or state S0, idle. It can also be from state S2 to S1 or S0 or corresponding levels in LTE.

Figure 6:
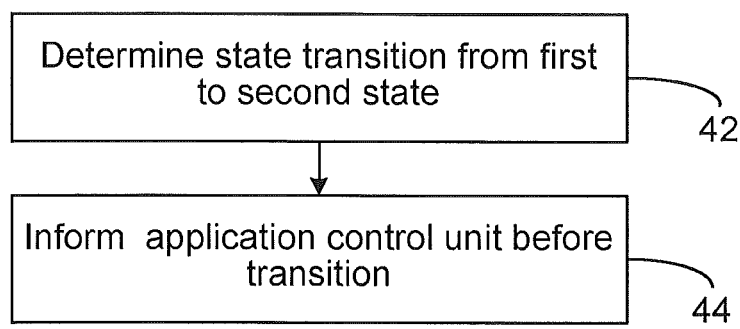
FIG. 6 shows method steps in a method for enabling avoiding of unnecessary radio resource use by a mobile station, being performed in a radio resource determination unit.
Figure 7:
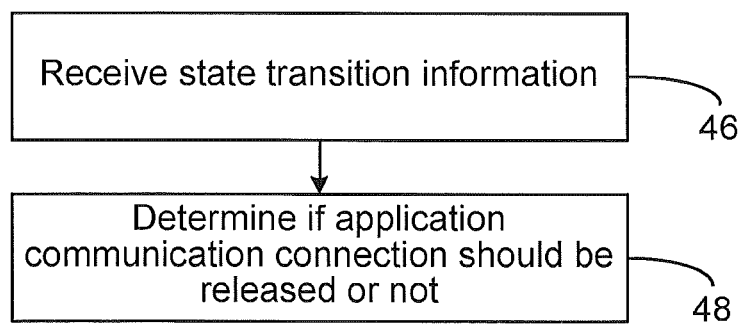
FIG. 7 shows a number of method steps in a method for controlling the release of application communication connections for an application in a mobile station, being performed in a application communication control unit.

Now a first embodiment will be described with reference being made to FIGS. 6 and 7, where FIG. 6 shows method steps in a method for enabling avoiding of unnecessary radio resource use by a mobile station, being performed in a radio resource determination unit and FIG. 7 shows a number of method steps in a method for controlling the release of application communication connections for an application in a mobile station, being performed in an application communication control unit 28.

The radio resource determination unit 24 determines a state transition for the radio resources between the mobile station and the mobile communication network, step 42, for instance through estimating when a state change or a state transition is to occur, where this state transition is a transition from a first current state to a second state, where the first state involves communication with a higher bandwidth than the second state, and informs an application communication control unit about the following-or ensuing state transition, step 44. This information is given to the application communication control unit prior to the change of state or state transition, which enables the application communication control unit to close down or release unused application communication connections.

The application in this way receives the information about a following state transition for the radio communication between the mobile station and the network from the first to the second state, step 46, and determines whether to release an application communication connection or not based on the information, step 48.

The application communication control unit may be a communication handling unit for the application, such as a TCP engine, in the following. termed TCP part. This may be a part of the application itself, which is understood from FIG. 2, or it may be a part 28 of the operating system OS of the mobile station as indicated in FIG. 3. The application communication control unit is thus a unit that handles connections for an application for instance the release of such connections. Application communication connections may here be connections in the transport layer according to the OSI model, layer 4, and are here TCP connections. However the invention may in some variations be used also for layers 5-7 of the model, i.e. for the session, presentation and application layers.

Figure 8:
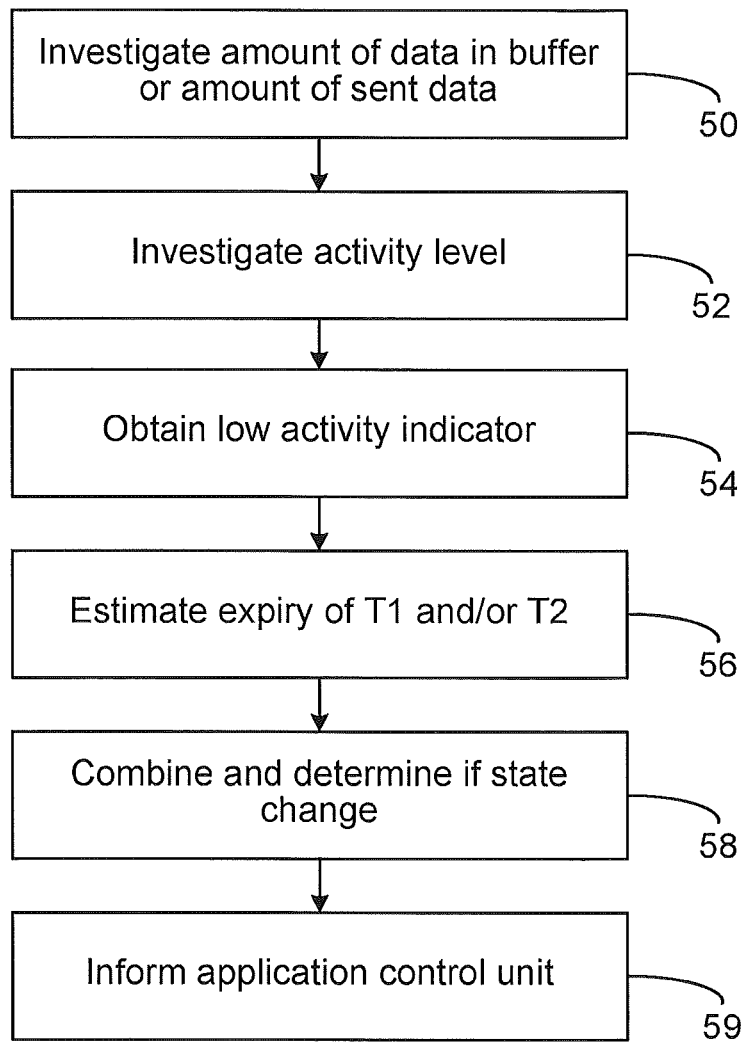
FIG. 8 shows method steps in a method for enabling avoiding of unnecessary radio resource use by a mobile station, being performed in a radio resource determination unit.
Figure 9:
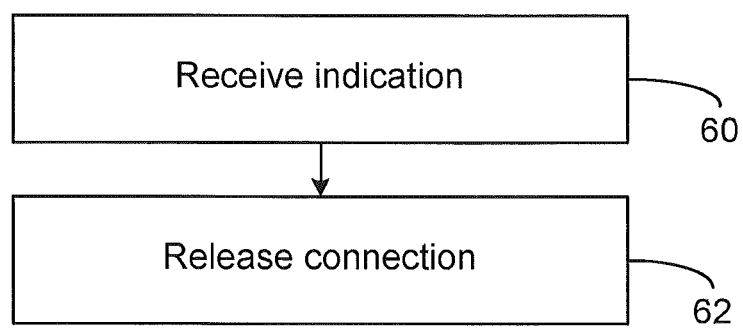
FIG. 9 shows method steps in a method for controlling the release of application communication connections for an application in a mobile station, being performed in a application communication control unit.

Now a second embodiment of the invention will be described with reference being made to FIGS. 8 and 9, where FIG. 8 shows method steps in a method for enabling avoiding of unnecessary radio resource use by a mobile station, being performed in the radio resource determination unit and FIG. 9 shows a number of method steps in a method for controlling the release of application communication connections for an application in a mobile station, being performed in the application communication control unit 28.

The radio resource determination unit 24 determines a state transition for the radio resources between the mobile station and the mobile communication network. The determination of a state transition, step 56, may be based on a low activity indicator. A low activity indicator may be obtained, step 54, based on investigating the amount of data of a buffer 30 of the mobile station, such as a transmission buffer as shown in FIG. 3, or measuring the amount of data packets being sent or received. Alternatively, or in addition, it may also be based on a low activity level of a user interface like a display or keyboard/keypad, step 52. The low activity level for the display may be that the display has been having a reduced energy level for a certain amount of time while the low activity level of the keypad may be that no or a limited number of user inputs have been detected for a certain amount of time. When a transmitting buffer is used, the low activity indicator may be obtained through the amount of data in the buffer being below a threshold for a certain amount of time. When measuring the amount of data packets, the low activity indicator may be obtained by detecting no data packets being sent or received for more than a certain amount of time.

The radio resource determination unit 24 may here be provided with a local state change element 32 that obtains a low activity indicator in the form of user data flow (for instance as determined through data in the transmitting buffer) and/or display keypad activity information as well as radio state technology, in order to determine a state transition caused by the mobile station, see FIG. 5.

The radio resource determination unit 24 may optionally also be provided with a network state change estimating element 34 configured to estimate the time of expiry of at least one state change timer of the mobile communication network, like for instance estimating the time of expiry of the timers T1 and/or T2, step 56. This may be done through investigating previous circumstances in the mobile station at which the system has decided on a state change and estimating that a state change is imminent if the same or a similar circumstance occurs.

There may also be a combining unit 36 combining these estimations and which determines that a state change is imminent if one of the elements indicates that a state change is to be made, step 58. An indication of an imminent state change is then sent to the application communication control unit 28, step 59.

As the application communication control unit 28 receives the indication, step 60, it may then decide to release a TCP connection ahead of the time used by the regular TCP timer, step 62. This may save energy, because if the TCP connection is to be released when the radio resource usage is low in the second state, it may be necessary to move back up to the first state using more radio resources perhaps only for this releasing of the TCP connection.

A method to optimize release of TCP connections together with a radio state machine may comprise one or more of the following:
- triggering release of TCP connections immediately before down switching radio state
- disregard TCP messages for releasing a TCP connection as data activity, to not prolong UE duration in high radio state
- special handling of TCP messages for releasing a TCP connection to avoid up switching to a higher radio state than necessary (for example in WCDMA, stay in Cell_FACH to release one or more TCP connections).

The release of a TCP connection is not governed by a fixed timer alone without consideration to current state of the radio access network.

The TCP release timer is set to a value optimized for the particular use case irrespectively of any release cost in the radio access network. However the radio access is continuously monitored and predicted in order to be able to release TCPs before the radio state change to a state where the cost of the release would be high/non-optimal.

Two different criteria can lead to that the TCPs are released ahead of the TCP inactivity timer expiry:
- The UE Fast Dormancy evaluation, based on the low activity indicator triggers to transition the UE to URA_PCH/Cell_PCH/Idle. Ahead of the signal being sent to the network the TCP part of the application is informed about the transition to be able to release its TCPs. As a further optimization the TCP part can be informed about the current radio state and access technology used in order to optimize the scheduling of multiple TCP releases.
- The UEs prediction of state transitions initiated by the Radio Network triggers to inform the TCP part of the application that a state transition is imminent and that the TCPs should be released. As a further optimization the TCP part can be informed about the current radio state and access technology used in order to optimize the scheduling of multiple TCP releases.

For the further optimization above, the information about current state may be considered by the application communication control unit when releasing application communication connections. The information may more particularly be used so that the release will not cause a state transition to a higher level requiring more resources than the current level provides. This means that if the current level as an example is the level CELL_FACH in FIG. 4, and a state transition to Idle is imminent, then, a decision of an application communication control unit to release a number of TCP connections simultaneously may lead to a transition to the DCH/HS level having to be made instead. This situation may for instance be avoided through sequentially releasing multiple application communication connections. As an example, for WCDMA, the release of multiple TCP connections when in the Cell_FACH state could be done sequentially to not trigger upswitch to Cell_DCH. Conversely, in the Cell_DCH state, multiple TCP connections can be released together. Note that "sequentially" does not necessarily mean that one connection is completely closed before requesting the next to close. It is enough (and preferable) that the requests (e.g. TCP FIN or TCP RST) to close connections are sent with a sufficient time interval between them to not trigger upswitch to Cell_DCH, i.e. the mobile does not need to wait for FIN ACK before sending FIN for the next TCP. The initiation of the release of multiple application communication connections may thus be sequential or made with a time-interval in between depending on the current state.

The above methods depict what decisions can be taken on the UE side of the connection. It is also possible to have the application communication control unit as a proxy unit 38 or TCP proxy deployed in the path between the client 26 and the server 16, for instance in the RNC 14, see FIG. 10. In this way the release of TCPs towards the UE can be terminated from the radio access network by controlling the proxy behaviour from the RNC.

Here it is also possible that the radio resource determination unit is provided in the network. It may here be a unit 40 in the network that estimates the timer T1 and T2. The unit 40 may be provided in the RNC 14. As an alternative it may be the network unit responsible for determining the timer T1 and T2. The unit 40 may then be set to inform the proxy unit 38 about the imminent change in radio resource state and the proxy unit may then decide to release connections. In this way the RNC 14 can take the decision to release the TCPs before the mobile station 10 is ordered to a different radio state. If the proxy unit 38 does release a TCP connection, also the application 26 will release a TCP connection.

Figure 10:
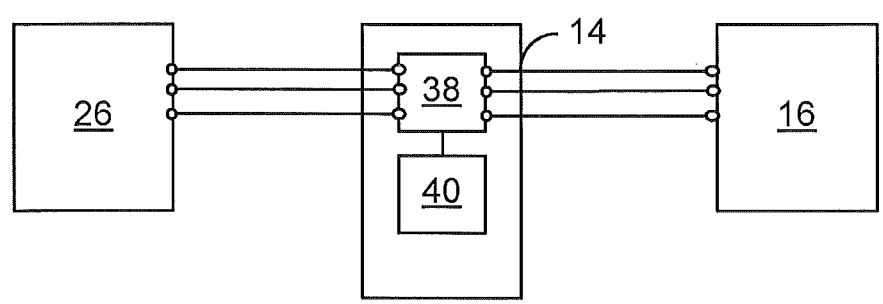
FIG. 10 shows another realization of the radio resource determination unit provided in the network.

In FIG. 10 the proxy unit and radio resource determination unit are provided in the same node. It should however be realized that they may be provided in different network nodes Furthermore a device providing an application communication control unit may also be considered to be a connection releasing device, which may be a mobile terminal or a network node, like an RNC.

Such information regarding the state change is not limited to being sent to a proxy unit in the network. The information may also be sent to the server 16, which may in turn decide to release TCP connections. This means that also the application server 16 may be or comprise an application communication control unit.

To further reduce the impact of TCP releases on the radio access network it is possible to disregard and introduce special handling on a number of specially flagged TCP packets, Finished (FIN) and Reset (RST) and acknowledgement (ACK). It may thus be seen that connectivity control commands of an application handling unit sent according to the application communication protocol, such as connection releasing commands, may be disregarded.

Whenever FIN or RST is sent on the link these packets may be disregarded so that they do not reset timers for Fast Dormancy or the T1/T2 timers in the network.

Whenever FIN or RST is sent on the link these may be not be considered to be user data and therefore they will not cause an up switch to a higher radio state requiring more bandwidth.

Further on it is possible to let the client learn the behaviour of certain servers, certain servers have long TCP inactivity timer and that knowledge is used to postpone the release of the TCP to a later point in time when the UE again has an active radio connection. This means that the connection handling unit can determine whether to release an application communication connection or not based on knowledge of the connection release behaviour of a corresponding application server. This functionality could also optionally be provided in the proxy unit.

There are several advantages associated with the various aspects of the invention. Today's uncoordinated TCP release handling introduces unnecessary radio network load and unnecessary UE battery drain. By making the TCP release dynamic, instead of a static timer choice, towards the underlying radio access network state the battery drain and radio network load can be minimized and a the same time keep some of the advantages of having long TCP release timeout.

The obvious simple solution would be to reduce the static timer to a small time value but then the advantage of persistent TCPs would never be present, in the invention this advantage is maximized without compromising battery and radio network load.

The radio resource determination unit and application communication control unit may both be provided in the form of a processor with associated program memory including computer program code for performing the functionality of these units.

Figure 11:
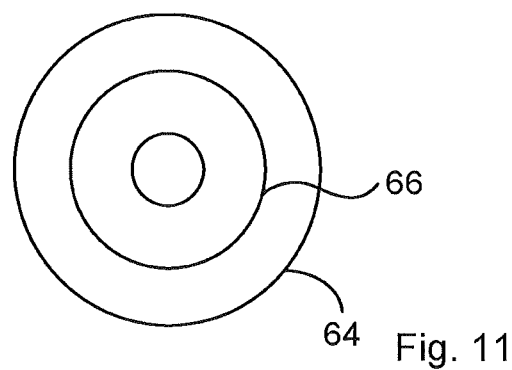
FIG. 11 shows a computer program product in the form of computer program code for implementing the radio resource determination unit and/or the application communication control unit.

Such a computer program may also be a computer program product, for instance in the form of a computer readable storage medium or data carrier, like a CD ROM disc or a memory stick, carrying such a computer program with the computer program code, which will implement the function of the above-described unit or units when being loaded into a mobile station or a network node. One such computer program. product in the form of a CD ROM disc 64 with the above-mentioned computer program code 66 is schematically shown in FIG. 11. It may also be provided on a memory stick or a server from which it may be downloaded.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method for enabling avoiding of unnecessary radio resource use by a mobile station having an application communicating with an application server via a mobile communication network using an application communication protocol comprising Transmission Control Protocol (TCP) connections between the mobile station and the application server, the method being performed for radio communication involving the mobile station and comprising:

estimating, in a radio resource determination unit, a predicted state transition for the radio resources between the mobile station and the mobile communication network from a first current state to a second state, where the first current state involves communication with a higher bandwidth than the second state, wherein estimating the predicted state transition comprises determining an estimate that predicts that a future state transition from the first current state to the second state will be initiated in the future, informing, by the radio resource determination unit and prior to the future state transition, at least one application communication control unit about the predicted state transition in order to allow the application communication control unit to release unused ones of the TCP connections between the mobile station and the application server before the future state transition, releasing, by the application communication control unit and responsive to the predicted state transition, the unused ones of the TCP connections between the mobile station and the application server prior to the future transition from the first current state to the second state, and disregarding, by the radio resource determination unit, TCP messages for releasing a TCP connection received at the mobile station from an application handling unit as data activity in relation to a state transition.

2. The method according to claim 1, wherein the predicted state transition is based on estimating the time of expiry of at least one state change timer of the mobile communication network prior to the at least one state change timer expiring.

3. The method according to claim 1, further comprising sending, by the radio resource determination unit to the application communication control an indication of the current state and considering, in the application communication control unit, the current state when releasing TCP connections.

4. The method according to claim 3, wherein the considering of the current state comprises sequentially initiating the release of multiple TCP connections with a time interval therebetween.

5. The method according to claim 1, farther comprising, determining, by the application communication control unit whether to release a TCP connection or not based on knowledge of the connection release behaviour of a corresponding application server.

6. The method according to claim 1, wherein the radio resource determination unit is provided in a node of the mobile communication network and the at least one application communication control unit is a proxy unit that is separate from the mobile station in the mobile communication network handling communication of the application in the mobile station with the application server, where the informing is an informing of the proxy unit of the predicted state transition, in order to let the proxy unit release at least one TCP connection prior to the future transition from the first current state to the second state.

7. The method according to claim 1, wherein the application server is external to the mobile communication network.

8. The method according to claim 1, wherein the estimate is determined prior to a determination by the mobile station or a radio network controller of the mobile communication network that the future state transition shall occur.

9. A method for enabling avoiding of unnecessary radio resource use by a mobile station having an application communicating with an application server via a mobile communication network using an application communication protocol comprising Transmission Control Protocol (TCP) connections between the mobile station and the application server, the method being performed for radio communication involving the mobile station and comprising:
  estimating, in a radio resource determination unit, a predicted state transition for the radio resources between the mobile station and the mobile communication network from a first current state to a second state, where the first current state involves communication with a higher bandwidth than the second state,
  wherein estimating the predicted state transition comprises determining an estimate that predicts that a future state transition from the first current state to the second state will be initiated in the future,
  informing, by the radio resource determination unit and prior to the future state transition, at least one application communication control unit about the predicted state transition in order to allow the application communication control unit to release unused ones of the TCP connections between the mobile station and the application server before the future state transition, and
  releasing, by the application communication control unit and responsive to the predicted state transition, the unused ones of the TCP connections between the mobile station and the application server prior to the future transition from the first current state to the second state,
  wherein the radio resource determination unit is provided in the mobile station, the application communication control unit is a connection handling unit in the mobile station and the predicted state transition is estimated based on a low activity indicator of the mobile station.

10. The method according to claim 9, wherein the low activity indicator is obtained based on investigating the amount of data of a transmission buffer of the mobile station or the amount of data sent or received during a time period.

11. The method according to claim 9, wherein the low activity indicator is obtained based on a low activity level of a user interface.

12. The method according to claim 9, wherein the estimate is determined prior to a determination by the mobile station or a radio network controller of the mobile communication network that the future state transition shall occur.

13. A radio communication handling device handling communication for an application running in a mobile station and communicating with an application server via a mobile communication network using an application communication protocol comprising Transmission Control Protocol (TCP) connections between the mobile station and the application server, the radio communication handling device comprising:
  a radio resource determination unit configured to:
    estimate a predicted state transition for the radio resources between the mobile station and the mobile communication network from a first current state to a second state, where the first current state involves communication with a higher bandwidth than the second state,
      wherein estimating the predicted state transition comprises determining an estimate that predicts that a future state transition from the first current state to the second state will be initiated in the future,
    inform, prior to the future state transition, at least one application communication control unit about the predicted state transition in order to allow the application communication control unit to release unused TCP connections before the future state transition from the first current state to the second state, and
  wherein the radio resource determination unit is further configured to disregard TCP messages for releasing a TCP connection received at the mobile station from an application handling unit as data activity in relation to a state transition.

14. The radio communication handling device according to claim 13, wherein the radio resource determination unit comprises a network state change estimating clement configured to estimate the time of expiry of at least one state change timer of the mobile communication network prior to the at least one state change timer expiring.

15. The radio communication handling device according to claim 13, further comprising at least one of said at least one application communication control unit being configured to determine whether to release a TCP connection or not based on said informing.

16. The radio communication handling device according to claim 15, said application communication control unit being configured to determine whether to release a TCP connection or not based on knowledge of the connection release behaviour of the corresponding application server.

17. The radio communication handling device according to claim 15, the application communication control unit being further configured to receive an indication of the current state from the radio resource determination unit and consider the current state when releasing TCP connections.

18. The radio communication handling device according to claim 13, where the radio communication handling device is provided in a network node that is separate front the mobile station.

19. The radio communication handling device according to claim 18, wherein the application communication control unit is a proxy unit provided in the network node that is separate from the mobile station, said proxy unit handling communication of the application running in the mobile station with the application server.

20. The radio communication handling device according to claim 13, wherein the estimate is determined prior to a determination by the mobile station or a radio network controller of the mobile communication network that the future state transition shall occur.

21. A radio communication handling device handling communication for an application running in a mobile station and communicating with an application server via a mobile communication network using an application communication protocol comprising Transmission Control Protocol (TCP) connections between the mobile station and the application server, the radio communication handling device comprising:
  a radio resource determination unit configured to:
    estimate a predicted state transition for the radio resources between the mobile station and the mobile communication network from a first current state to a second state, where the first current state involves communication with a higher bandwidth than the second state,
      wherein estimating the predicted state transition comprises determining an estimate that predicts that a future state transition from the first current state to the second state will be initiated in the future, and
    inform, prior to the future state transition, at least one application communication control unit about the predicted state transition in order to allow the application communication control unit to release unused TCP connections before the future state transition from the first current state to the second state,
wherein the radio communication handling device is the mobile station and the application communication control unit is a connection handling unit in the mobile station.

22. The radio communication handling device according to claim 21, wherein the radio resource determination unit comprises a local state change element configured to estimate the predicted state transition based on a low activity indicator of the mobile station.

23. The radio communication handling device according to claim 22, wherein the local state change element is configured to estimate the predicted state transition based on the low activity indicator by investigating the amount of data of a transmission buffer of the mobile station or the amount of data sent or received during a time period.

24. The radio communication handling device according to claim 22, wherein the local state change element is configured to estimate the predicted state transition based on a low activity level of a user interface.

25. The radio communication handling device according to claim 21, wherein the estimate is determined prior to a determination by the mobile station or a radio network controller of the mobile communication network that the future state transition shall occur.

26. A method for controlling the release of application communication connections for an application in a mobile station, said application communicating with a corresponding application server via a mobile communication network using an application communication protocol comprising Transmission Control Protocol (TCP) connections between the mobile station and the application server, the method being performed in an application communication control unit and comprising:
receiving, from a radio resource determination unit for radio communication involving the mobile station, information about an estimate that predicts that a future state transition, for the radio communication between the mobile station and the mobile communication network from a first current state to a second state will be initiated by a radio network controller of the mobile communication network separate from the mobile station, where the first current state involves communication with a higher bandwidth than the second state,
releasing a TCP connection prior to the future state transition based on the information about the estimate, and
receiving an indication of the current state and considering the current state when Releasing TCP connections,
wherein the considering of the current state comprises sequentially initiating the release of multiple TCP connections with a time interval therebetween.

27. The method according to claim 26, wherein releasing the TCP connection is further based on knowledge of the connection release behaviour of the corresponding application server.

28. The method according to claim 26, wherein the application communication control unit is a proxy unit that is separate from the mobile station in the mobile communication network handling communication of the application with the application serer and further comprising releasing, by the proxy unit, at least one TCP connection before the future state transition to the second state thereby making the application in the mobile station also release at least one TCP connection.

29. The method according to claim 26, wherein the TCP connections are TCP connections between the mobile station and the application server.

30. The method according to claim 26, wherein the information about the estimate is received prior to a determination by the radio network controller of the mobile communication network that the future state transition shall occur.

31. A connection releasing device for controlling the release of application communication connections for an application in a mobile station, said application communicating with a corresponding application server via a mobile communication network using an application communication protocol comprising Transmission Control Protocol (TCP) connections between the mobile station and the application server, the connection releasing device comprising an application communication control unit configured to:
receive, from a radio resource determination unit for radio communication involving the mobile station, information about an estimate that predicts that a future state transition for the radio communication between the mobile station and the mobile communication network from a first current state to a second state will be initiated by a radio network controller of the mobile communication network separate from the mobile station, where the first current state involves communication with a higher bandwidth than the second state,
release a TCP connection prior to the future state transition based on the information about the estimate, and
receive an indication of the current state and consider the current state when releasing TCP connections,
wherein the considering of the current state comprises sequentially initiating the release of multiple TCP connections with a time interval therebetween.

32. The connection releasing device according to claim 31, wherein the application communication control unit is further configured to release the TCP connection based on knowledge of the connection release behaviour of the corresponding application server.

33. The connection releasing device according to claim 31, wherein the connection releasing device is a network node that is separate from the mobile station and the application communication control unit is a proxy unit handling communication of the application with the application server, the proxy unit being further configured to release at least one TCP connection before the future state transition to the second state thereby making the application in the mobile station also release at least one TCP connection.

34. The connection releasing device according to claim 31, wherein the application communication connection releasing device is a mobile station and the application communication control unit is a connection handling unit in the mobile station.

35. The connection releasing device according to claim 31, wherein the information about the estimate is received prior to a determination by the radio network controller of the mobile communication network that the future state transition shall occur.

* * * * *